United States Patent
Lin et al.

(10) Patent No.: US 11,455,425 B2
(45) Date of Patent: *Sep. 27, 2022

(54) METHODS, APPARATUSES, AND SYSTEMS FOR UPDATING SERVICE MODEL BASED ON PRIVACY PROTECTION

(71) Applicant: ALIPAY (HANGZHOU) INFORMATION TECHNOLOGY CO., LTD., Zhejiang (CN)

(72) Inventors: Yilun Lin, Hangzhou (CN); Hongjun Yin, Hangzhou (CN); Jinming Cui, Hangzhou (CN); Chaochao Chen, Hangzhou (CN); Li Wang, Hangzhou (CN); Jun Zhou, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/512,539

(22) Filed: Oct. 27, 2021

(65) Prior Publication Data

US 2022/0129700 A1 Apr. 28, 2022

Related U.S. Application Data

(63) Continuation of application No. 17/511,517, filed on Oct. 26, 2021.

(30) Foreign Application Priority Data

Oct. 27, 2020 (CN) .......................... 202011159885.1

(51) Int. Cl.
*G06F 21/62* (2013.01)
*G06K 9/62* (2022.01)
(Continued)

(52) U.S. Cl.
CPC ....... *G06F 21/6245* (2013.01); *G06K 9/6256* (2013.01); *G06N 3/0454* (2013.01); *G06N 3/08* (2013.01)

(58) Field of Classification Search
CPC .. G06K 9/6256; G06K 9/6259; G06K 9/6267; G06N 3/0454; G06N 3/08;
(Continued)

(56) References Cited

U.S. PATENT DOCUMENTS

2016/0379112 A1* 12/2016 He ...................... G06N 3/0454
706/25
2018/0024510 A1* 1/2018 Matsushima .......... G06N 3/063
700/48
(Continued)

FOREIGN PATENT DOCUMENTS

CN 108122027 6/2018
CN 108122032 6/2018
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Michael S Osinski
(74) *Attorney, Agent, or Firm* — Fish & Richardson P.C.

(57) ABSTRACT

A computer-implemented method, medium, and system are disclosed. One example method includes determining multiple model bases by multiple service parties. A respective local service model is constructed by each service party. Respective local training samples are processed by each service party using the respective local service model to determine respective gradient data corresponding to each model basis. The respective gradient data is sent to a server.
(Continued)

In response to determining that the first model basis satisfies a gradient update condition, corresponding gradient data of the first model basis received from each service party are combined to obtain global gradient data corresponding to the first model basis. The global gradient data is sent to each service party. Reference parameters in local model basis corresponding to the first model basis are updated by each service party using the global gradient data to train the respective local service model.

18 Claims, 5 Drawing Sheets

(51) Int. Cl.
*G06N 3/04* (2006.01)
*G06N 3/08* (2006.01)

(58) Field of Classification Search
CPC ...... G06N 3/082; G06N 3/0445; G06N 3/063; G06N 3/0472; G06N 3/084; G06N 3/088; G06N 20/00; G06N 20/20; G06N 7/005; G06N 5/003; G06F 21/6245; A61B 5/7267
See application file for complete search history.

(56) References Cited

U.S. PATENT DOCUMENTS

| | | | |
|---|---|---|---|
| 2018/0157940 A1* | 6/2018 | Yang | G06N 3/04 |
| 2019/0188605 A1* | 6/2019 | Zavesky | G06N 20/00 |
| 2019/0213475 A1* | 7/2019 | Erlandson | G06K 9/6282 |
| 2020/0012969 A1* | 1/2020 | Jiang | G06N 20/00 |
| 2020/0134370 A1* | 4/2020 | Chopra | G06N 5/003 |
| 2020/0184272 A1* | 6/2020 | Zhang | G06N 20/00 |
| 2020/0210774 A1* | 7/2020 | Jakubowicz | G06N 3/08 |
| 2020/0218940 A1* | 7/2020 | Anglin | G06K 9/6218 |
| 2020/0285944 A1* | 9/2020 | Lee | G06N 3/0472 |
| 2020/0302184 A1* | 9/2020 | Lem | G06V 40/172 |
| 2020/0311615 A1* | 10/2020 | Jammalamadaka | G06N 20/20 |
| 2020/0320753 A1* | 10/2020 | Feng | G06T 11/008 |
| 2020/0401948 A1* | 12/2020 | Ma | G06F 11/3495 |
| 2021/0042590 A1* | 2/2021 | Watts | G06N 7/005 |
| 2021/0150284 A1* | 5/2021 | Chiang | G06N 20/00 |
| 2021/0224692 A1* | 7/2021 | Akiba | G06N 7/005 |
| 2021/0232934 A1* | 7/2021 | Lai | G06N 20/00 |
| 2021/0271975 A1* | 9/2021 | Chen | G06V 20/40 |
| 2021/0295148 A1* | 9/2021 | Gonsalves | G06V 10/56 |
| 2021/0334656 A1* | 10/2021 | Sjogren | G06N 3/08 |
| 2021/0342743 A1* | 11/2021 | Woolf | G06F 16/215 |
| 2021/0350233 A1* | 11/2021 | Saboori | G06N 3/082 |
| 2021/0398210 A1* | 12/2021 | Mhlanga | G06Q 30/0282 |
| 2021/0398681 A1* | 12/2021 | Shah | G16H 10/60 |
| 2022/0005042 A1* | 1/2022 | Shiftman | G06Q 20/409 |
| 2022/0121929 A1* | 4/2022 | Subbaraya | G06K 9/6267 |

FOREIGN PATENT DOCUMENTS

| | | |
|---|---|---|
| CN | 111523686 | 8/2020 |
| CN | 111553484 | 8/2020 |
| WO | WO 2020191282 | 9/2020 |

OTHER PUBLICATIONS

Nakamoto, "Bitcoin: A Peer-to-Peer Electronic Cash System," www.bitcoin.org, 2005, 9 pages.

* cited by examiner

METHODS, APPARATUSES, AND SYSTEMS FOR UPDATING SERVICE MODEL BASED ON PRIVACY PROTECTION

CROSS REFERENCE TO RELATED APPLICATIONS

This application is a continuation of and claims the benefit of priority of U.S. patent application Ser. No. 17/511,517, filed Oct. 26, 2021, which claims priority to Chinese Patent Application No. 202011159885.1, filed on Oct. 27, 2020. The contents of the prior applications are herein incorporated by reference in their entirety.

TECHNICAL FIELD

One or more embodiments of the specification relate to the field of computer technology, and in particular, to methods, apparatuses, and systems for updating a service model based on privacy protection.

BACKGROUND

With the development of the computer technology, machine learning has been widely used in various service scenarios. Federated learning is a method of joint modeling under the condition of protecting private data. For example, cooperative security modeling is needed between enterprises, and federated learning can be carried out, so as to use data of all parties to train a data processing model cooperatively on the premise of fully protecting the privacy of enterprise data, so as to process service data more accurately and effectively. In a federated learning scenario, for example, after all parties agree on a model architecture (or an agreed model), the parties use private data to perform training locally, aggregate model parameters by using a safe and credible method, and finally improve the local model according to the aggregated model parameters. The federated learning, on the basis of privacy protection, can effectively break through data islands and realize multi-party joint modeling.

Graph data is a type of data that describes an association relationship between various entities. In the process of federated learning, each service party may usually hold graph data with different architectures. For example, a first-party bank holds graph data of nodes corresponding to users, lending service, and income and association relationships thereof, and a second-party local life service platform holds graph data of nodes corresponding to users, lending service, goods or services and association relationships thereof. Because local private data cannot be leaked to each other, it is difficult to train a graph neural network.

SUMMARY

One or more embodiments of the specification describe methods and apparatuses for updating a service model based on privacy protection, to solve one or more of the problems mentioned in the background.

A first aspect provides a method for updating a service model based on privacy protection. The service model is used for determining a corresponding service processing result based on processing of related service data and is trained jointly by a plurality of service parties assisted by a server. The method includes the following: The plurality of service parties determines, through negotiation, a plurality of model bases, where an individual model basis is a parameter cell including a plurality of reference parameters. Each service party constructs a local service model based on a combination of the model bases in a predetermined mode. Each service party processes local training samples by using the local service model, to determine respective gradient data corresponding to each model basis, and sends the respective gradient data to the server. The server fuses, in response to that the individual model basis satisfies a gradient update condition, the respective gradient data of the individual model basis to obtain global gradient data corresponding to the individual model basis, and feeds back the global gradient data to each service party. Each service party updates the reference parameters in the corresponding local model basis according to the fused global gradient data, to iteratively train the local service model.

In some embodiments, the gradient update condition includes at least one of: a quantity of received gradient data of the model basis reaches a predetermined quantity; or an update period has arrived.

In some embodiments, the server fuses the respective received gradient data of the individual model basis by one of: averaging, weighted averaging, or processing the respective gradient data arranged in a chronological order by using a pre-trained long short-term memory model.

In some embodiments, the service model is a graph neural network, each service party holds respective graph data constructed depending on local data, and the respective graph data are heterogeneous graphs.

In some embodiments, an individual gradient data of the individual model basis includes gradients respectively corresponding to the reference parameters in the individual model basis.

In some embodiments, the predetermined mode includes at least one of: a linear combination mode; or a network architecture search NAS mode.

A second aspect provides a method for updating a service model based on privacy protection. The service model is used for determining a corresponding service processing result based on processing of related service data and is trained jointly by a plurality of service parties assisted by a server. The method is performed by a first party of the plurality of service parties and includes the following: Local training samples are processed by using a local service model constructed based on a combination of a plurality of model bases in a predetermined mode, to determine respective gradient data corresponding to each model basis, and the respective gradient data are sent to the server for the server to update global gradient data of the individual model basis by using the received plurality of gradient data according to a gradient update condition corresponding to the individual model basis, where the plurality of model bases are determined by the plurality of service parties through negotiation, and the individual model basis is a parameter cell including a plurality of reference parameters. In response to receiving the global gradient data of a first model basis from the server, local gradient data of the first model basis are updated according to the global gradient data of the first model basis. According to the updated local gradient data, the reference parameters included in the first model basis are updated.

In some embodiments, the updating local gradient data of the first model basis according to the global gradient data includes replacing the local gradient data of the first model basis with the global gradient data.

In some embodiments, the updating local gradient data of the first model basis according to the global gradient data includes the following: The global gradient data and the local gradient data of the first model basis are averaged with weighting to obtain weighted gradient data. Local gradient data of a plurality of reference parameters corresponding to the first model basis are updated according to the weighted gradient data.

In some embodiments, the predetermined mode includes at least one of: a linear combination mode; or a network architecture search NAS mode.

In some further embodiments, the service model is a multi-layer neural network, and model parameters of a single-layer neural network are a linear combination of the plurality of model bases.

In a further embodiment, the processing local training samples by using a local service model of which the model parameters are determined based on the linear combination of the plurality of model bases, to determine respective gradient data corresponding to each model basis includes the following: A loss of the service model is determined by comparing a sample label and an output result of the service model for a current training sample. Aiming at minimizing the loss, the respective gradient data corresponding to each model basis corresponding to the single-layer neural network are determined layer by layer from the last layer of neural network.

In some embodiments, the service model is a graph neural network, each service party holds respective graph data constructed by local data, and the respective graph data are heterogeneous graphs.

In some embodiments, an individual gradient data of the individual model basis includes gradients respectively corresponding to the reference parameters in the individual model basis.

A third aspect provides a method for updating service model based on privacy protection. The service model is used for determining a corresponding service processing result based on processing of related service data and is trained jointly by a plurality of service parties assisted by a server. The method is performed by the server and includes the following: respective gradient data of a first model basis are obtained from each service party, where the first model basis is a parameter cell which is determined by the plurality of service parties through negotiation and includes a plurality of reference parameters, and each service party processes local training samples by using a local service model determined by combining a plurality of model bases including the first model basis in a predetermined mode, to determine the respective gradient data corresponding to the first model basis. In response to that the first model basis satisfies a gradient update condition, the respective received gradient data of the first model basis are fused, to obtain global gradient data of the first model basis. The global gradient data of the first model basis is sent to each service party for each service party to update the reference parameters of the local first model basis based on the global gradient data of the first model basis.

In some embodiments, the gradient update condition includes at least one of: a quantity of received gradient data of the model basis reaches a predetermined quantity; or an update period has arrived.

In some embodiments, the global gradient of the first model basis is obtained by fusing the respective received gradient data of the first model basis by one of: averaging, weighted averaging, processing the respective gradient data arranged in a chronological order by using a pre-trained long short-term memory model.

In some embodiments, an individual gradient data of the individual model basis includes gradients respectively corresponding to the reference parameters in the individual model basis.

In some embodiments, the predetermined mode includes at least one of: a linear combination mode; or a network architecture search NAS mode.

A fourth aspect provides a system for updating a service model based on privacy protection. The system includes a plurality of service parties and a server. The service model is used for determining a corresponding service processing result based on processing of related service data and is trained jointly by the plurality of service parties assisted by the server.

An individual service party is configured to: negotiate with another service party to determine a plurality of model bases, construct a local service model based on a combination of the model bases in a predetermined mode, and process local training samples by using the local service model, to determine respective gradient data corresponding to each model basis and send the respective gradient data to the server, where the individual model basis is a parameter cell including a plurality of reference parameters.

The server is configured to: fuse, in response to that the individual model basis satisfies a gradient update condition, the respective gradient data of the individual model basis to obtain global gradient data corresponding to the individual model basis, and feed back the global gradient data to each service party.

The individual service party is further configured to: update the reference parameters in the corresponding local model basis according to the fused global gradients, to iteratively train the local service model.

A fifth aspect further provides an apparatus for updating a service model based on privacy protection, where the service model is used for determining a corresponding service processing result based on processing of related service data and is trained jointly by a plurality of service parties assisted by a server. The apparatus is disposed on a first party of the plurality of service parties and includes: a gradient determining unit, configured to: process local training samples by using a local service model constructed based on a combination of a plurality of model bases in a predetermined mode, to determine respective gradient data corresponding to each model basis and send the respective gradient data to the server for the server to update global gradient data of the individual model basis by using the received plurality of gradient data according to a gradient update condition corresponding to the individual model basis, where the plurality of model bases are determined by the plurality of service parties through negotiation, and the individual model basis is a parameter cell including a plurality of reference parameters; a gradient update unit, configured to update, in response to receiving the global gradient data of a first model basis from the server, local gradient data of the first model basis according to the global gradient data of the first model basis; and a parameter update unit, configured to update, according to the updated local gradient data, the reference parameters included in the first model basis.

A sixth aspect provides an apparatus for updating a service model based on privacy protection. The service model is used for determining a corresponding service processing result based on processing of related service data and is trained jointly by a plurality of service parties assisted by a server. The apparatus is disposed on the server and includes: a communication unit, configured to obtain respective gradient data of a first model basis from each service party, where the first model basis is a parameter cell which is determined by the plurality of service parties through negotiation and includes a plurality of reference parameters, and each service party processes local training samples by using a local service model determined by combining a plurality of model bases including the first model basis in a predetermined mode, to determine the respective gradient data corresponding to the first model basis; a fusion unit, configured to fuse, in response to that the first model basis satisfies a gradient update condition, the respective received gradient data of the first model basis, to obtain global gradient data of the first model basis. The communication unit is further configured to send the global gradient data of the first model basis to each service party for each service party to update the reference parameters of the local first model basis based on the global gradient data of the first model basis.

A seventh aspect provides a computer-readable storage medium, which stores a computer program, and the computer program enables a computer to perform the methods according to the first aspect, the second aspect, or the third aspect when the computer program is executed in the computer.

An eighth aspect provides a computing device, including a memory and a processor. The memory stores executable code, and the processor, when executing the executable code, implements the methods according to the first aspect, the second aspect, or the third aspect.

By the methods, apparatuses, and systems provided in the embodiments of the specification, with regard to the incapability of unified modeling for graph data (heterogeneous graphs) of different architectures provided by service parties in a federated learning process, a technical concept that model parameters are locally consistent is provided. Model bases are set, one model basis can include a plurality of reference parameters, and each service party constructs a local model parameter vector or matrix by using a combination of the model bases in a predetermined mode, so as to construct a local service model. In the process of federated learning, the service parties upload local gradient data at the granularity of a model basis, the server updates the global gradient data at the granularity of a model basis, and the service parties update local model parameters at the granularity of a model basis. The technical solution of locally updating model parameters can effectively break down the barriers for federated learning under heterogeneous graphs, provides a brand-new machine learning idea, can be extended to various service models, and is not limited to machine learning models processing graph data.

BRIEF DESCRIPTION OF DRAWINGS

To more clearly explain the technical solution of the embodiments of the present invention, the drawings needed in the description of embodiments will be briefly described below, and clearly, the drawings described below are only some embodiments of the present invention, from which other drawings can be obtained without creative effort by a person of ordinary skill in the art.

DESCRIPTION OF EMBODIMENTS

The solutions provided in the specification will be described with reference to the accompanying drawings.

Figure 1:
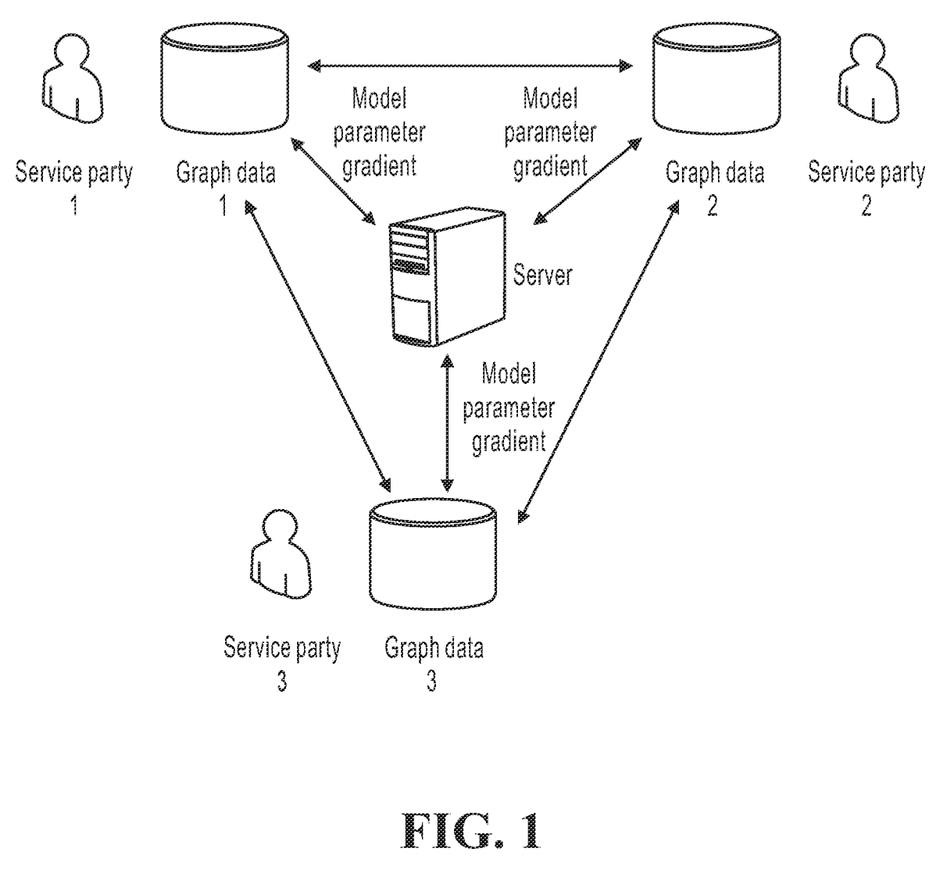
FIG. 1 is a schematic diagram of a specific implementation architecture of federated learning.

First, the description will be made in combination with a specific implementation scenario shown in FIG. 1. FIG. 1 is a specific implementation architecture of federated learning. In the implementation architecture, a service model can be jointly trained by two or more service parties. Each service party can use the trained service model to process a local service. Generally, each service party has data correlation. For example, in a plurality of service parties involved in financial service, a service party 1 is a bank providing users with services such as savings and loans, and can hold data such as users' age, gender, income and expenditure flow, credit line, and deposit limit, a service party 2 is a P2P platform and can hold data such as users' loan records, investment records, and repayment time limit, and a service party 3 is a shopping website and holds data such as users' shopping habits, payment habits, and payment accounts.

In the process of federated learning, each service party can respectively hold local sample data. The sample data are regarded as private data and are not expected to be known by other parties. In the process of federated learning, each service party trains the service model by using the local sample data to obtain a local gradient of model parameters of the service model.

The server can provide assistance for federated learning of the service parties, for example, assisting in non-linear calculation, global model parameter gradient calculation, or the like. The server shown in FIG. 1 is in a form of another party independent of the service parties such as a trusted third party. In practice, the server can alternatively be distributed in or includes service parties. The service parties can adopt a secure computing protocol (such as secret sharing) to complete joint aided computing. The specification is not limited to this.

The service parties can further obtain gradient data of global model parameters from the server, to update local model parameters.

When the service data is described by a graph architecture and constitutes graph data, the service model can be a machine learning model such as a graph neural network, an RDF2Vec, or a Weisfeiler-Lehmankemels algorithm (Weisfeiler-Lehmankemels, WL). In the process of federated learning, each service party combines pre-constructed graph data, processes relevant training samples by using a corresponding service model, and obtains an output result.

One example is a graph neural network, which is a generalized neural network based on a graph architecture (that is, graph data). The graph neural network can use underlying graph data as a calculation graph, and determine neural network neurons to generate a node embedding vector by transferring, transforming, and aggregating node feature information on the whole graph. The generated node embedding vector can be used as an input of any differentiable prediction layer, and can be used for node classification or prediction of connection between nodes. A complete graph neural network can be trained in an end-to-end manner. In a specific example, an update method of a layer of graph neural network can be as follows:

$$h_i^{(l+1)} = \sigma\left(\sum_{r \in R}\sum_{j \in N_l} \frac{1}{c_{i,r}} W_r^{(l)} h_j^{(l)} + W_o^{(l)} h_i^{(l)}\right)$$

h represents a node, i represents an $i^{th}$ node in graph data, l and l+1 represent corresponding layers of the graph neural network, W represents a model parameter vector or matrix, c is a weight or a normalization factor, N represents a set of neighboring nodes, R is a set of graph data nodes, r represents a service party r, and σ is an activation function.

It can be understood that the graph data is usually constructed by nodes corresponding to entities one by one and connecting edges between nodes (corresponding to the association relationship between the entities), and the architecture may be complicated. For each service party, if the corresponding service data includes different entities or different connection relationships, the architecture of the graph data can be quite different. For example, a service party is a payment platform, and in the graph data constructed from the service data the service party holds, the entities corresponding to the nodes can be users, and the association relationship between the nodes can be address book friends, transfer frequencies, or the like. Another service party is a shopping platform, the entities corresponding to the nodes can include two types of users, i.e., consumers and merchants, and the association relationship between the nodes can be sharing product links among consumers or among merchants and consumers, consumers buying goods from merchants, or the like. More service parties can further include graph data of more architectures. In other words, each service party can construct one or more graph data according to the service data thereof, and these graph data constitute "heterogeneous graphs". In this case, it is difficult to process the local graph data of each service party through a unified graph neural network.

Figure 2:
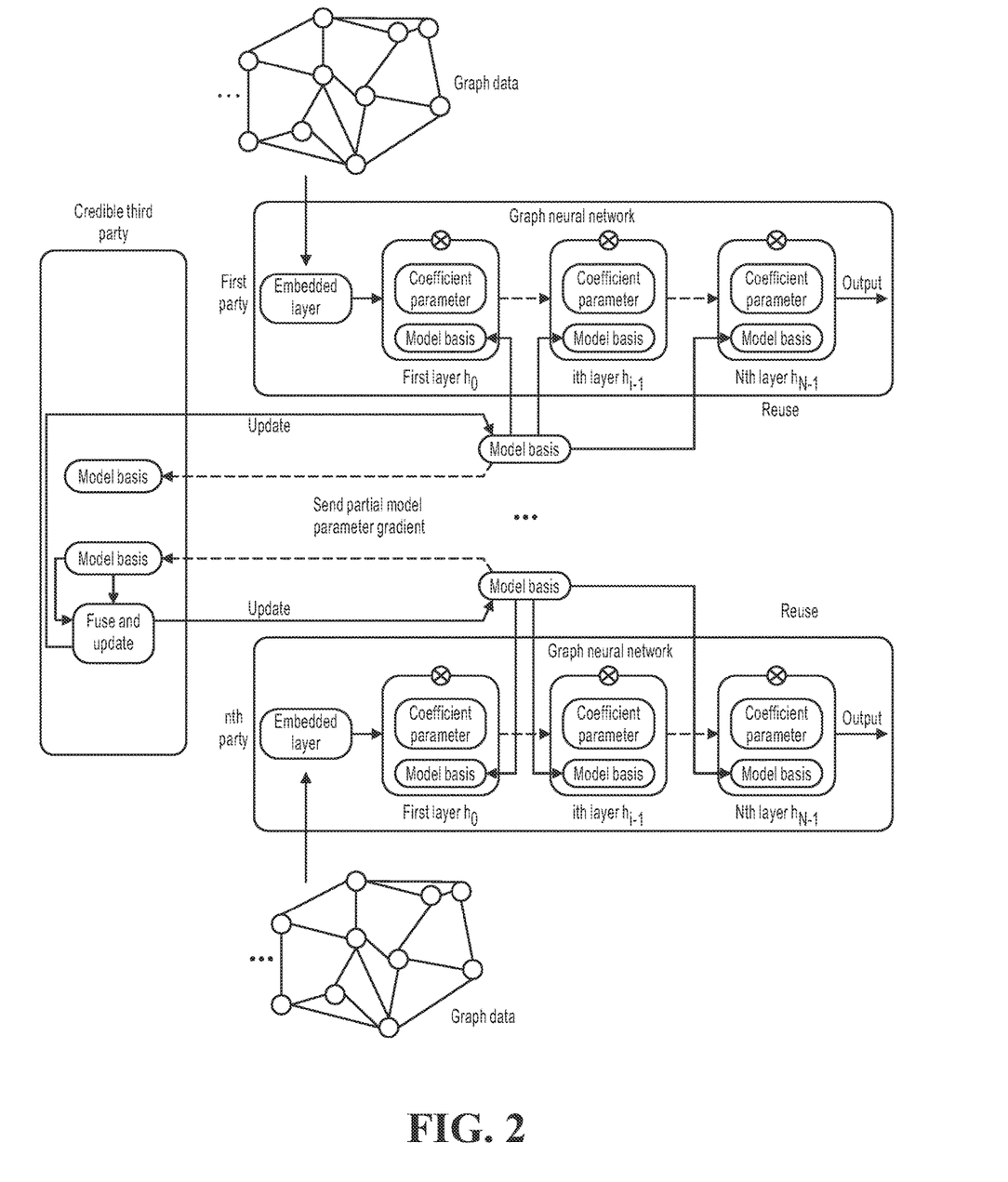
FIG. 2 is a schematic diagram of an implementation framework of a technical concept of the specification.

Therefore, the specification puts forward a concept of model parameter localization. Referring to FIG. 2, under the technical concept of the specification, the concept of model basis is put forward. The model basis can be regarded as a basic parameter cell that constitutes a service model (such as a graph neural network). One model basis can include a plurality of reference model parameters. The model basis is shared between each service party, and the service party constructs its own graph neural network locally based on the model basis. A basic architecture of the model basis can be jointly agreed by each service party, for example, a quantity of model bases, dimensions of each model basis, and meanings of each dimension, etc. An activation function, optimization method, and a task type that needs to be predicted in the service model can also be agreed by each service party. When constructing a service model of an individual service party, the model parameters thereof can be defined by a linear combination of model bases, and can alternatively be determined by a combination of another mode of model bases (such as the network architecture search NAS mode). As shown in the figure, when the graph neural network is constructed, the parameters of each layer of the neural network can be a linear combination of each model basis. The model basis can be in a form of vector or matrix that includes reference parameters. Description is provided below by using a linear combination of model bases as an example.

If an $l^{th}$ layer of a graph neural network of a service party r is represented by $W_r^{(l)}$, a model basis is represented by V, a quantity is B, and an individual model basis is denoted as $V_b$, a model parameter $W_r^{(l)}$ can be expressed as:

$$W_r^{(l)} = \sum_{b=1}^{B} a_{rb}^{(l)} V_b^{(l)}$$

$a_{rb}^{(l)}$ represents a linear coefficient of a model basis b corresponding to the model parameter of the $l^{th}$ layer of the graph neural network of the service party r. The coefficient can be predetermined by the service party r, and can alternatively be adjusted as a parameter of the service model in the process of model training, which is not limited herein.

In this way, the model parameters of each layer of the graph neural network of each service party can be represented by a linear combination of a plurality of model bases.

In the process of federated learning, each service party trains the graph neural network according to the sample data, and determines a model loss by comparing an output result and a sample label, so as to determine a gradient of parameters involved in each model basis in each layer of the neural network, and sends the gradient to a server. A gradient update condition a model basis can be predetermined in the server. For example, gradient data fed back by an individual model basis reaches a predetermined quantity (such as 100) or a predetermined period (such as 10 minutes) has passed. When the predetermined gradient update condition is met, the server can fuse the received gradients of the corresponding model bases to obtain a global gradient. Fusion methods include, but are not limited to, summing, averaging, maximizing, minimizing, long short-term memory neural network unit (LSTM), and the like.

The server feeds back the global gradient of the updated model basis (local model parameters) to each service party, and each service party updates a gradient of the model parameters of the local service model according to the global gradient, such as replacing and weighted summing gradients of the local model parameters. Therefore, each service party can update the corresponding model parameter gradient. Under gradient convergence of model parameters or other termination conditions (such as the quantity of update rounds reaching a predetermined quantity), the process of federated learning ends.

In this way, the idea of localizing the model parameters in the specification breaks through the boundary of heterogeneous graphs among service parties, so that more service data can be used to train the graph neural network of each service party through federated learning on the premise of protecting privacy, without requiring the model architectures of each service party to be consistent.

It should be noted that the technical concept of the specification is based on the federated learning problem of service models such as graph neural networks, but the practical application thereof is not limited to the service models such as graph neural networks, and it can be reasonably applied to any service models, such as convolution neural networks CNN, long short-term memory model LSTM, and the like.

Figure 3:
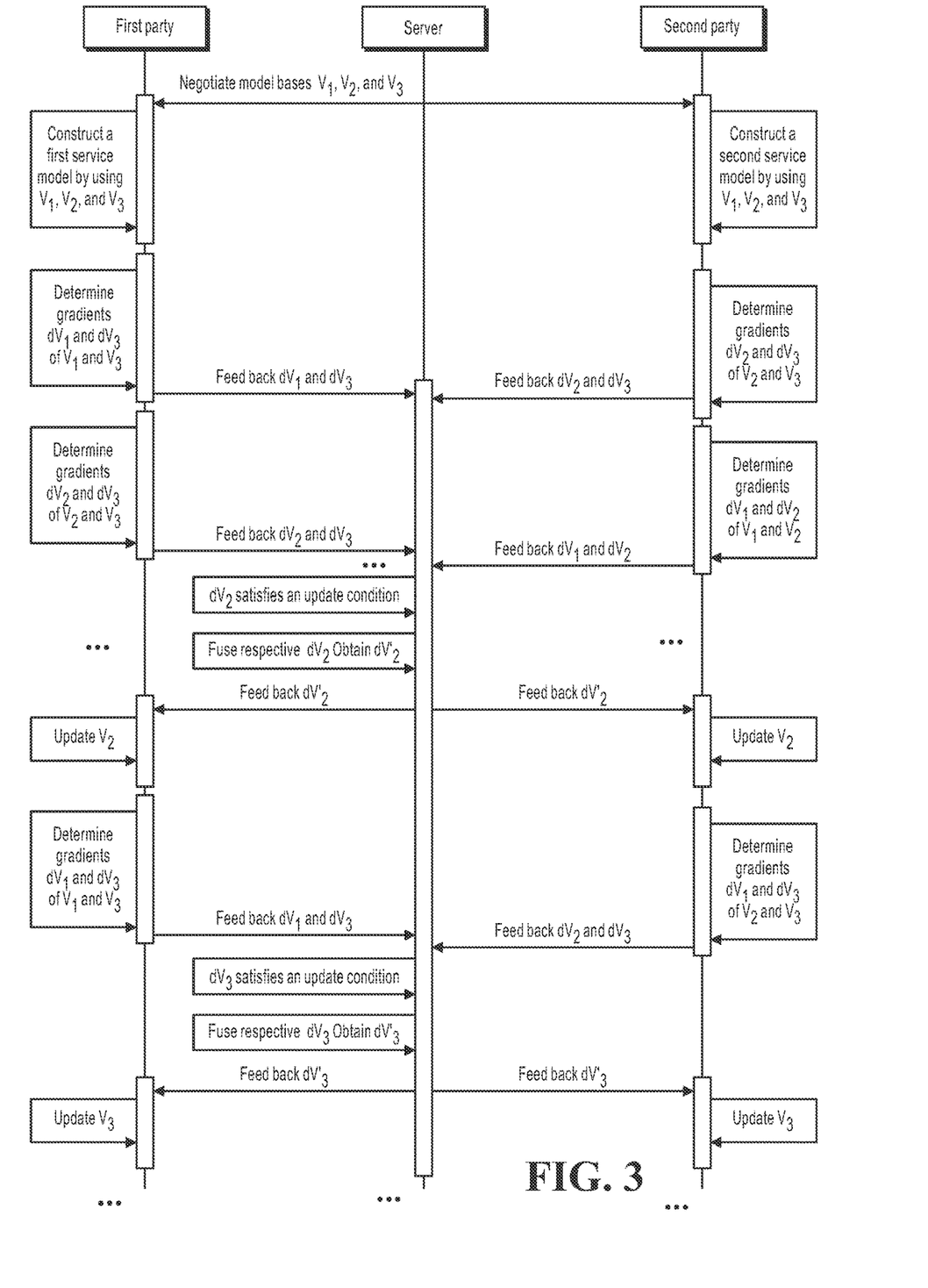
FIG. 3 is an operational sequencing diagram for updating a service model based on privacy protection according to an embodiment.

To more clearly describe the technical concept of the specification, the following is described in combination with the example of FIG. 3. FIG. 3 is a collaborative sequencing diagram of all parties for updating a service model based on privacy protection according to an embodiment. In FIG. 3, assume that the service parties participating in calculation include a first party and a second party. In practice, there can be more service parties.

As shown in FIG. 3, first, the first party and the second party can determine a plurality of model bases through negotiation, which are assumed as $V_1$, $V_2$, and $V_3$. Content negotiated by the first party and the second party may, for example, include dimensions of the model bases. In addition, under the premise of federated learning, each service party can also negotiate an intermediate architecture of the service model, such as activation function setting, optimization method, a task type that needs to be predicted, and the like. The model bases $V_1$, $V_2$, and $V_3$ each can include a plurality of model parameters. Generally, different model bases include different reference parameters. For example, the model basis $V_1$ includes $w_1$ and $w_2$, the model basis $V_2$ includes $w_3$, $w_4$, and $w_5$, the model basis $V_3$ includes $w_6$, $w_7$, $w_8$, and $w_9$, and so on. In an optional implementation, to better adapt to each service party, different model bases can include the same model parameters. For example, $V_1$ includes $w_1$ and $w_2$, $V_2$ includes $w_2$, $w_3$, and $w_4$, $V_3$ includes $w_1$, $w_4$, $w_5$, and $w_6$, and so on.

Next, the first party can construct a local first service model by using $V_1$, $V_2$, and $V_3$, and the second party can construct local second service model by using $V_1$, $V_2$, and $V_3$. According to an embodiment, the model parameters of both the first service model and the second service model can be determined by a linear combination of $V_1$, $V_2$, and $V_3$. The linear coefficient can be adjusted in the process of model training, or can be a set value. For example, in the first service model, the model parameter $W_1=a_1V_1+a_2V_2+a_3V_3$, where $a_1$, $a_2$, and $a_3$ can be set fixed values, such as 3, 4, and 7, or can be a parameter to be adjusted. When the service model is a multi-layer neural network, the model parameters of each layer of the neural network can be determined by the linear combination of each model basis. According to another embodiment, the model parameters of the first service model and the second service model can be determined by a network architecture search (neural architecture search, NAS) mode. In this way, a neural network used for generating a service model for processing graph data can be used to generate a new network as a service model using a model basis as an input.

Then, the first party and the second party can use local service data to train the service models they constructed. The service data of each service party can be determined according to specific service scenarios. Generally, the service data held by each service party can constitute training samples. When the service model is a graph neural network based on graph data, the service data provided by each service party can further include graph data and training samples. Generally, the graph data can include various entities corresponding to service parties in related service, such as questions, tags, documents (or answers) in customer service Q&A service scenarios, and users and financial products in financial risk scenarios. Each node can correspond to a node expression vector. The graph neural network updates the node expression vector of the current node by fusing node expression vectors of neighboring nodes, and the finally determined node expression vector is used as an input vector of a subsequent neural network (such as an activation layer) to obtain a final output result. For example, the expression vector of the node corresponding to the user "Zhang San" in the graph data is processed by the graph neural network, and is then further processed to obtain an output result of 0.8 risk probability.

In the process of training the service model, each service party can determine a model loss according to the comparison between the sample label and the output result of the service model after processing using the local service model and according to training samples thereof, and determine a gradient of model parameters in each model basis by using the model loss. For convenience, in FIG. 3, the gradient of the reference parameters in the model basis can be denoted as gradient data of the corresponding model basis. For example, in the process of a round of iterative training, the first party determines gradients of reference parameters in $V_1$, $V_2$, and $V_3$, respectively. In the process of a round of iterative training, the first party first calculates the gradient by using the last layer of neural network, determines the gradient of the reference parameters in each model basis at the granularity of the model basis $V_2$ or $V_3$, and then determines gradient data of the model bases $V_1$ and $V_3$ by using a previous layer of the neural network. As shown in FIG. 3, after each service party determines the gradient data of a plurality of model bases in one gradient calculation (such as gradient calculation for one-layer of neural network), the corresponding gradient data can be fed back to the server.

The server can receive the gradient data of the model basis sent by each service party at any time. It can be understood that a gradient update condition of a model basis can further be pre-stored in the server, for example, updating periodically (for example, every one minute), updating when an individual model basis has received a predetermined quantity (for example, 100) of new gradient data, or the like. For an individual model basis, when the gradient update condition is met, the server can update the global gradient data of the corresponding model basis by using the received gradient data. The global gradient data herein can include the global gradient of each reference parameter in the corresponding model basis.

Referring to FIG. 3, for example, if the gradient update condition corresponding to the model basis $V_2$ is updating when 100 gradient data have been received, when the server has received 100 gradient data related to $V_2$ from each service party, the server fuses the 100 gradient data and updates the global gradient data of $V_2$ by using a fused result.

It should be noted that in the linear combination of each model basis, the coefficients of some model bases could be 0, which may result in that the generation speed of the quantity of gradients corresponding to each model basis is not necessarily consistent. However, in other modes (such as, the NAS mode), the distribution of each model basis may be more uneven. Therefore, the server can update each model basis according to the gradient update condition thereof. Optionally, the gradient update conditions of each model basis can be consistent, for example, updating when a predetermined quantity of gradient data has been received, or updating when a predetermined period (for example, 10 minutes) has passed.

In the conventional process of a federated learning task, the gradient data can be fused by the server by averaging and weighted summing the gradients provided by plurality of service parties. In the implementation architecture of the specification, in addition to conventional fusion methods, temporal sequence neural networks such as LSTM can be used to process the received gradient data. This is because each gradient data of the model basis received by the server has temporal sequence characteristics. By processing the gradient data with time series characteristics by using a temporal sequence neural network, the change trend characteristics of gradients can be integrated by making full use of the temporal sequence characteristics.

Each service party can repeat the process of model training, calculating gradient data of each model basis, sending the gradient data in unit of model basis, until receiving the updated global gradient data for a model basis sent by the server, the service party can adjust the local model parameters (corresponding models and included reference parameters) according to the updated global gradient data. As shown in FIG. 3, the first party can update $V_2$ when receiving the global gradient data $dV'_2$ of $V_2$ sent by the server, and continue to repeat the process of model training, calculating gradient data in unit of model basis, and sending the gradient data by using the updated model parameters. The first party can update $V_3$ when further receiving the global gradient data $dV'_3$ of $V_3$ sent by the server, and continue to repeat the process of model training, calculating gradient data in unit of model basis, and sending the gradient data by using the updated model parameters, until the model training is completed.

In some embodiments, when the service party updates the corresponding reference parameter according to the global gradient data of an individual model basis, the local model basis gradient data can be updated by replacing the gradient data of the local model basis with the global gradient, and the reference parameter included in the corresponding model basis can be adjusted according to the updated model basis gradient data. For example, in FIG. 3, when receiving $dV'_3$, the first party replaces local $dV_3$, that is, $dV_3=dV'_3$, and updates $V_3$.

In another embodiment, when the service party updates the corresponding reference parameter according to the global gradient data of an individual model basis, the local model basis gradient data can be updated by weighted averaging the global gradient data and the gradient data of the local model basis, and the corresponding reference parameter can be adjusted according to the updated model basis gradient data. For example, in FIG. 3, when receiving $dV'_3$, the first party obtains, in combination with the local $dV_3$, the updated gradient data $dV_3=s_1\ dV'_3+s_2\ dV_3$, and updates $V_3$ by using the updated $dV_3$.

In more embodiments, the service party can further use the global gradient data of the model basis to update the gradient data of the local model basis in more ways, and further adjust the corresponding reference parameters, which will not be repeated herein.

It can be understood that after determining the gradient of an individual reference parameter within the model basis, the service party can update the related model parameters according to a predetermined model parameter update method. By using the gradient descent method as an example, the update mode of reference parameters can be: w=w-l*dw, which is not repeated herein.

In the above-mentioned process, an effective solution is given to solve the training bottleneck in federated learning based on privacy protection in the case that each service party provides graph data with different architectures (heterogeneous graphs). The solution proposed above localizes the model parameters of the service model, the concept of model basis is put forward. The model basis is used to represent a parameter cell including a plurality of reference parameters. Each service party constructs a local service model by combining each model basis in a predetermined mode. In the process of model training, the gradient data is calculated at the granularity of the model basis, and the server updates the corresponding global gradient data at the granularity of the model basis, so that the service party can update some model parameters (reference parameters in one or more model bases) at a time. In this way, it is possible for each service party to train a service model that makes full use of global data by using the graph neural network thereof based on the heterogeneous graphs formed by the graph data thereof in the process of federated learning. In addition, the solution can be extended to a variety of suitable service models, providing a new idea for federated learning.

Figure 4:
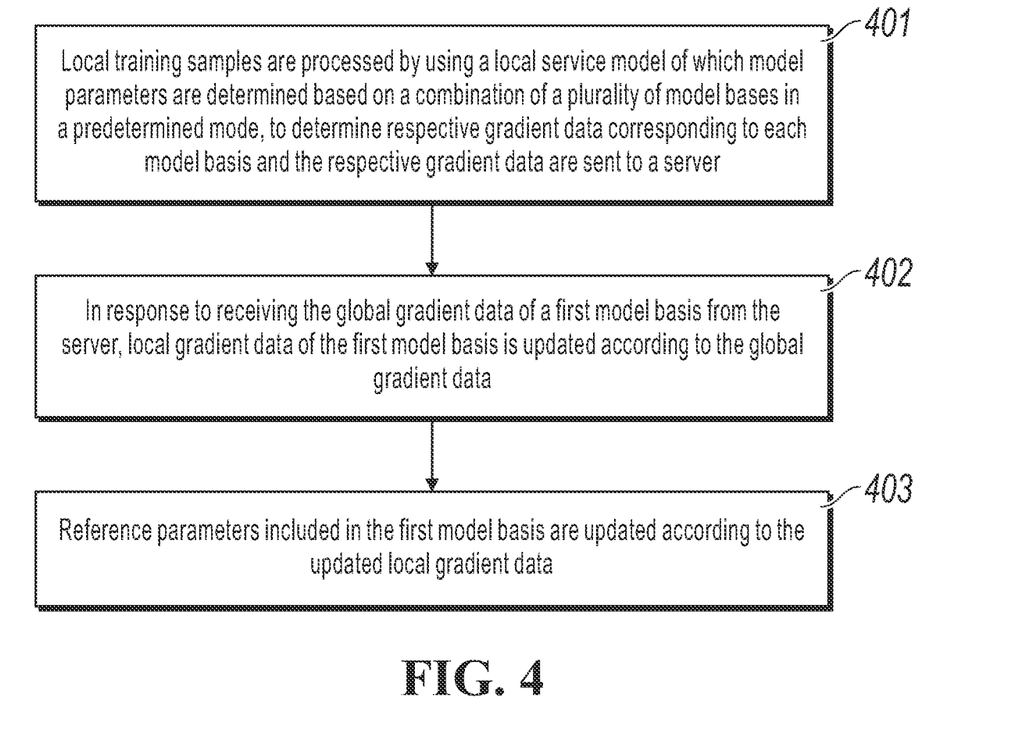
FIG. 4 is flowchart of a method for processing service data based on privacy protection according to an embodiment.

The technical concept of the specification is generally explained in combination with the above-mentioned description. Any individual service party, for example, a first party, is used as an example below to describe the process of updating a service model based on privacy protection performed by the first party in some embodiments. As shown in FIG. 4, a process 400 performed by the first party can include the following steps.

First, in step 401, local training samples are processed by using a local service model determined based on a combination of a plurality of model bases in a predetermined mode, to determine respective gradient data corresponding to each model basis and the respective gradient data are sent to a server. Each model basis can be determined by a plurality of service parties through negotiation, and an individual model basis is a parameter cell including a plurality of reference parameters. The server can receive gradient data of an individual model basis sent by each service party and update global gradient data of the individual model basis according to a gradient update condition. The predetermined mode can be, for example, a linear combination mode, a network search mode, or the like.

When the service model is a multi-layer neural network, the model parameters of a single-layer neural network can be a combination of a plurality of model bases in a predetermined mode. Optionally, in this case, a loss of the service model is determined by comparing a sample label and an output result of the service model for a current training sample. Further, aiming at minimizing the loss, the respective gradients corresponding to each model basis corresponding to the single-layer neural network are determined layer by layer from the last layer of neural network and sent to the server.

In some embodiments, each service party holds respective graph data constructed by local data, and the service model can further be a graph neural network. Optionally, the graph data held by each service party can be heterogeneous graphs.

Then, through step 402, in response to receiving the global gradient data of a first model basis from the server, local gradient data of the first model basis is updated according to the global gradient data. Here, the first model basis can be any one of the model bases. According to the description in FIG. 3, the server can independently determine the corresponding global gradient data for each model basis according to the gradient update conditions, so the global gradient data issued by the server at a time may only involve all or part of the model bases. For the first party, the global gradient data of the model basis currently updated by the server (for example, including the first model basis herein) can be received and the local gradient data of the corresponding model basis can be updated according to the global gradient data thereof.

The first party can perform weighted averaging on the global gradient data and the local gradient data of the first model basis to obtain a weighted gradient, and then update the local gradient corresponding to each reference parameter in the first model basis according to the weighted gradient. The first party can alternatively replace the local gradient data of the first model basis with the global gradient data of the first model basis, to update the local gradient data of the first model basis. The first party can alternatively update the local gradient data of the first model basis in another method, which is not limited herein.

Subsequently, in step 403, reference parameters included in the first model basis are updated according to the updated local gradient data. The method for updating the model parameters can be determined by the first party in advance or negotiated with other service parties in advance. By using the gradient descent method as an example, each model parameter can be updated in the following method: w=w-l*dw, which is not repeated herein.

Figure 5:
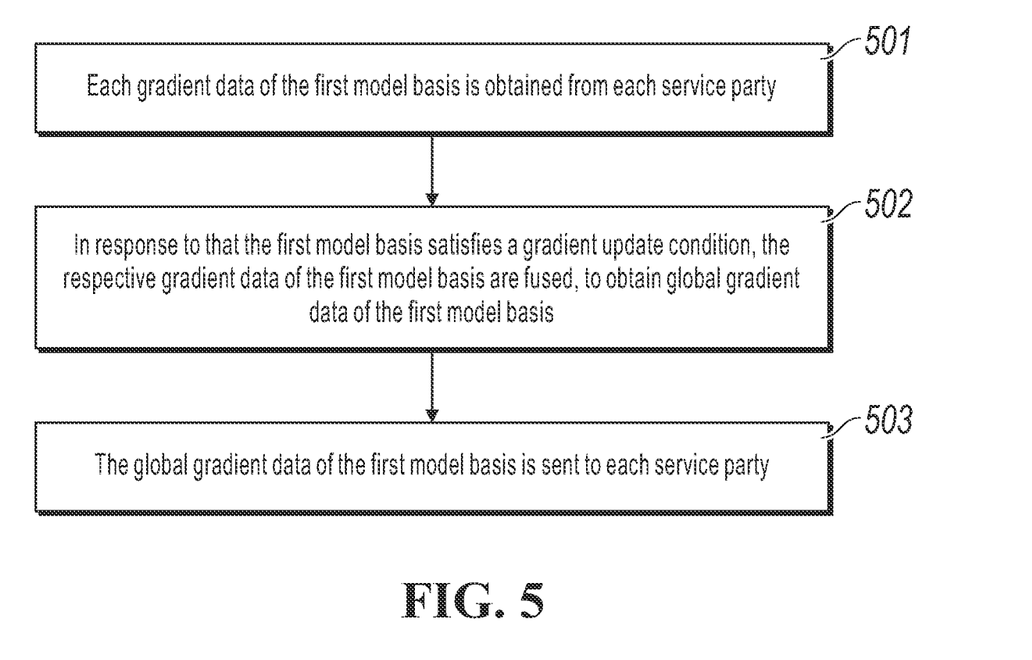
FIG. 5 is a flowchart of a method of processing service data based on privacy protection according to another embodiment.

In another aspect, a server is used as an example to describe the process of updating a service model based on privacy protection performed by the first party in some embodiments. As shown in FIG. 5, a process 500 performed by the server can include the following steps.

First, in step 501, each gradient data of the first model basis is obtained from each service party. A plurality of service parties can determine a plurality of parameter cells including a plurality of reference parameters, that is, model bases, through negotiation, and the first model basis can be any one of the plurality of model bases. Each service party can process local training samples by using a local service model determined by combining a plurality of model bases including the first model basis in a predetermined mode, to determine a gradient corresponding to the first model basis and sends the gradient to the server. The predetermined mode can be, for example, a linear combination mode, a network search mode, or the like.

Subsequently, in step 502, in response to that the first model basis satisfies a gradient update condition, the respective received gradient data of the first model basis are fused, to obtain global gradient data of the first model basis. The gradient update condition is a trigger condition for the server to update the global gradient data of an individual model basis, for example, a quantity of received gradient data of the model basis reaches a predetermined quantity; or an update period is arrived; or the like. The server can store a unified gradient update condition for each model basis, and can alternatively set gradient update conditions for each model basis respectively, which is not limited herein.

When a corresponding gradient update condition is met for any first model basis, for example, 100 gradient data for the first model basis have been received, the received gradient data (for example, 100) can be fused to determine the global gradient data thereof. Optionally, to ensure the timeliness of the gradient data, the fused gradient data can be the gradients received after the previous global gradient fusion, such as 100 newly received gradient data.

In some embodiments, the server can fuse the corresponding gradient data to determine the global gradient data thereof based on an arithmetic average of the gradient data for the first model basis.

In another embodiment, the server can fuse corresponding gradient data to determine the global gradient thereof based on a weighted average of gradient data for the first model basis. The weighting weight can be set in advance or determined according to the receiving time, for example, the weight is negatively correlated with the distance between the receiving time and the current time.

In another embodiment, the server can alternatively process the gradient data of the first model basis arranged in a chronological order by using a pre-trained long short-term memory model (LSTM). In this way, the correlation of gradient data in a chronological order can be fully mined.

In other embodiments, the server can alternatively fuse the gradient data of the first model basis in other modes, such as taking the last one, taking the maximum value, or the like.

Then, through step 503, the global gradient data of the first model basis is sent to each service party for each service party to update the reference parameters of the local first model basis based on the global gradient data of the first model basis.

It should be noted that the embodiments shown in FIG. 4 and FIG. 5, respectively correspond to the first party (or the second party) and the server shown in FIG. 3, and the related description of FIG. 3 is also applicable to the embodiments of FIG. 4 and FIG. 5, which is not repeated herein.

Embodiments of another aspect further provide a system for updating a service model based on privacy protection. The system for updating a service model includes a server and a plurality of service parties. The server can assist the plurality of service parties to jointly train the service model. In the implementation architecture of the specification, the server can fuse gradients of model parameters determined by each service party, to determine a global gradient, and distribute the global gradient to each serving party.

Figure 6:
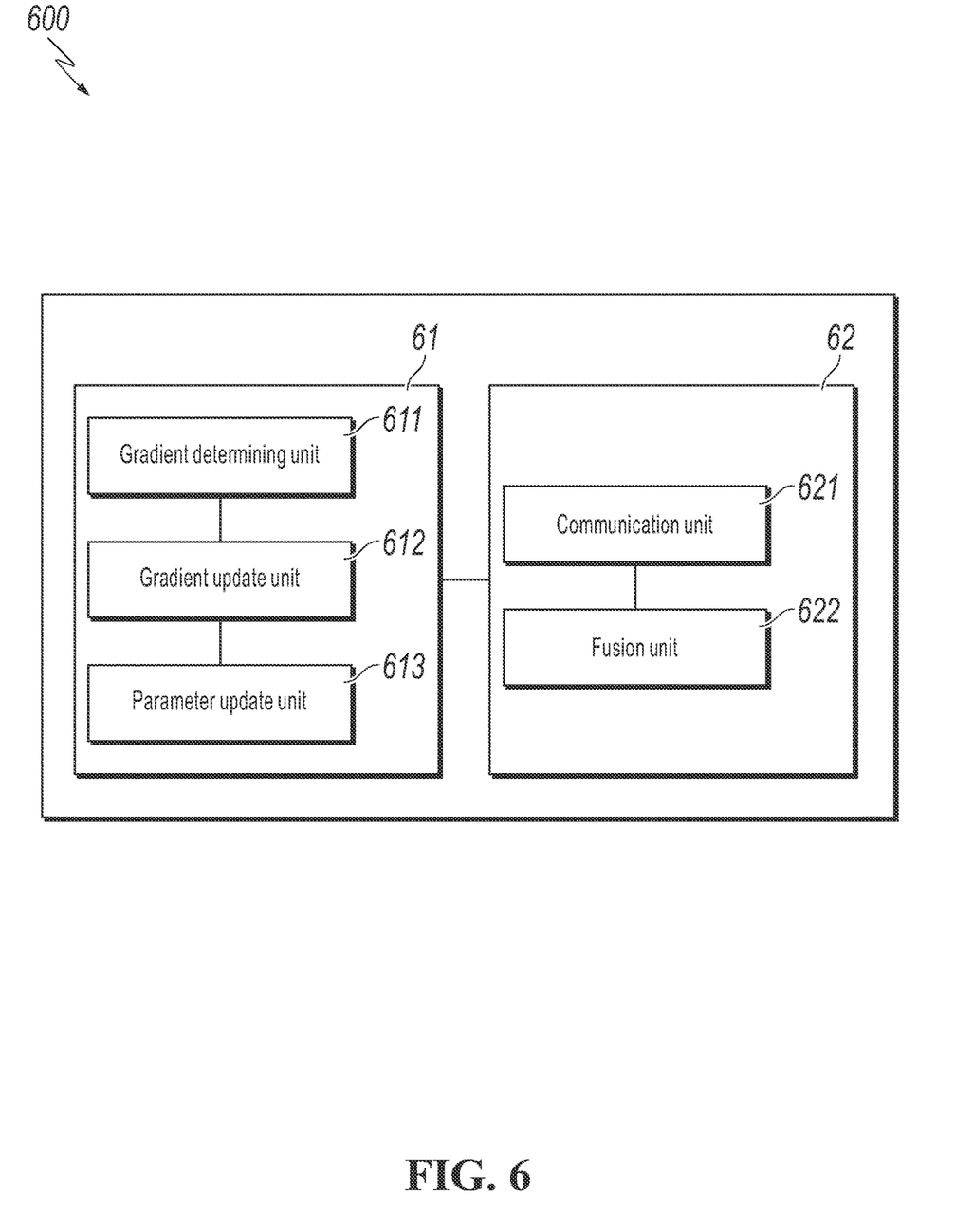
FIG. 6 is a schematic block diagram of a system for updating a service model based on privacy protection according to an embodiment.

Specifically, as shown in FIG. 6, a system 600 includes a plurality of service parties and a server 62. Any one of the service parties can be denoted as a service party 61.

The service party 61 is configured to: negotiate with another service party to determine a plurality of model bases, construct a local service model based on a combination of model bases in a predetermined mode, and process local training samples by using the local service model, to determine respective gradient data corresponding to each model basis and send the respective gradient data to the server, where the model basis is a parameter cell including a plurality of reference parameters. The predetermined mode can be, for example, a linear combination mode; or a network search mode.

The server 62 is configured to: fuse, in response to that the individual model basis satisfies a gradient update condition, the respective gradient data of the individual model basis to obtain global gradient data of the individual model basis, and feed back the global gradient data to each service party.

The service party 61 is further configured to: update the reference parameters in the corresponding local model basis according to the fused global gradient data, to iteratively train the local service model.

Specifically, in some embodiments, the service party 61 can be provided with an apparatus 610 for updating a service model, including the following:

A gradient determining unit 611, configured to: process local training samples by using a local service model determined based on a combination of a plurality of model bases in a predetermined mode, to determine respective gradient data corresponding to each model basis and send the respective gradient data to the server for the server to update global gradient data of the individual model basis according to a gradient update condition, where the plurality of model bases are determined by the plurality of service parties through negotiation, and the individual model basis is a parameter cell including a plurality of reference parameters. The predetermined mode can be, for example, a linear combination mode; or a network search mode.

A gradient update unit 612, configured to update, in response to receiving the global gradient data of a first model basis from the server, local gradient data of the first model basis according to the global gradient data.

A parameter update unit 613, configured to update, according to the updated local gradient data, the reference parameters included in the first model basis.

In some embodiments, the server 62 can be provided with an apparatus 620 for updating a service model, including the following:

A communication unit 621, configured to obtain respective gradient data of a first model basis from each service party, where the first model basis is a parameter cell which is determined by the plurality of service parties through negotiation and includes a plurality of reference parameters, and each service party processes local training samples by using a local service model determined by combining a plurality of model bases including the first model basis in a predetermined mode, to determine the respective gradient data corresponding to the first model basis. The predetermined mode can be, for example, a linear combination mode; a network search mode, or the like.

A fusion unit 622 is configured to fuse, in response to that the first model basis satisfies a gradient update condition, the respective gradient data of the first model basis, to obtain global gradient data of the first model basis.

A communication unit 611 is further configured to send the global gradient data of the first model basis to each service party, for each service party to update the reference parameters of the local first model basis based on the global gradient data of the first model basis.

It should be noted that the system 600, the apparatus 610, and the apparatus 620 shown in FIG. 6 are product embodiments respectively corresponding to the method embodiments shown in FIG. 3, FIG. 4, and FIG. 5, and the corresponding descriptions in the method embodiments shown in FIG. 3, FIG. 4, and FIG. 5 are applicable to the apparatus system 600, the apparatus 610, and the apparatus 620, respectively, and will not be repeated herein.

An embodiment of another aspect further provides a computer-readable storage medium, which stores a computer program, and the computer program enables a computer to perform the methods described in combination with FIG. 4 or FIG. 5 when the computer program is executed in the computer.

An embodiment of another aspect further provides a computing device, including a memory and a processor. The memory stores executable code, and the processor, when executing the executable code, implements the method described in combination with FIG. 4 or FIG. 5.

It should be appreciated by a person skilled in the art that, in one or more of the examples, the functions described in the embodiments of the specification can be implemented in hardware, software, firmware, or any combination thereof. When implemented in software, these functions can be stored in a computer-readable medium or transmitted as one or more instructions or code on the computer-readable medium.

The specific implementations described above, the objective, technical solution, and beneficial effects of the technical concept of the specification are further explained in detail. It should be understood that, the above description is only the specific implementation of the technical concept of the specification, and is not intended to limit the scope of protection of the technical concept of the specification. Any modification, equivalent replacement, improvement, or the like made on the basis of the technical solution of the embodiments of the specification shall be included in the scope of protection of the technical concept of the specification.

What is claimed is:

1. A computer-implemented method, comprising:
    determining, by a plurality of service parties, a plurality of model bases, wherein each model basis of the plurality of model bases comprises a plurality of corresponding reference parameters;
    constructing, by each service party of the plurality of service parties, a respective local service model based on a respective combination of the plurality of model bases;
    determining, by each service party, respective gradient data corresponding to each model basis including processing respective local training samples using the respective local service model;
    sending, by each service party, the respective gradient data to a server;
    determining, by the server, that a first model basis of the plurality of model bases satisfies a gradient update condition pre-stored in the server;
    in response to determining that the first model basis satisfies the gradient update condition, combining, by the server, corresponding gradient data of the first model basis received from each service party to obtain global gradient data corresponding to the first model basis;
    sending, by the server, the global gradient data corresponding to the first model basis to each service party; and
    training, by each service party, the respective local service model including updating reference parameters in local model basis corresponding to the first model basis using the global gradient data.

2. The method according to claim 1, wherein the gradient update condition comprises at least one of:
    a quantity of gradient data of the first model basis received by the server from the plurality of service parties reaches a predetermined quantity; or
    an update period has arrived.

3. The method according to claim 1, wherein the server combines the corresponding gradient data of the first model basis received from each service party by one of: averaging, weighted averaging, or processing the corresponding gradient data arranged in a chronological order by using a pre-trained long short-term memory model.

4. The method according to claim 1, wherein the respective local service model comprises a graph neural network, wherein each service party holds respective graph data constructed using local data, and wherein the respective graph data comprise heterogeneous graphs.

5. The method according to claim 1, wherein the respective gradient data corresponding to each model basis comprises gradients respectively corresponding to reference parameters in each model basis.

6. The method according to claim 1, wherein the respective combination of the plurality of model bases comprises at least one of:
    a linear combination of the plurality of model bases; or
    a network architecture search (NAS) based on the plurality of model bases.

7. A non-transitory, computer-readable medium storing one or more instructions executable by a computer system to perform operations comprising:
    determining, by a plurality of service parties, a plurality of model bases, wherein each model basis of the plurality of model bases comprises a plurality of corresponding reference parameters;

constructing, by each service party of the plurality of service parties, a respective local service model based on a respective combination of the plurality of model bases;

determining, by each service party, respective gradient data corresponding to each model basis including processing respective local training samples using the respective local service model;

sending, by each service party, the respective gradient data to a server;

determining, by the server, that a first model basis of the plurality of model bases satisfies a gradient update condition pre-stored in the server;

in response to determining that the first model basis satisfies the gradient update condition, combining, by the server, corresponding gradient data of the first model basis received from each service party to obtain global gradient data corresponding to the first model basis;

sending, by the server, the global gradient data corresponding to the first model basis to each service party; and training, by each service party, the respective local service model including updating reference parameters in local model basis corresponding to the first model basis using the global gradient data.

8. The non-transitory, computer-readable medium according to claim 7, wherein the gradient update condition comprises at least one of:
   a quantity of gradient data of the first model basis received by the server from the plurality of service parties reaches a predetermined quantity; or
   an update period has arrived.

9. The non-transitory, computer-readable medium according to claim 7, wherein the server combines the corresponding gradient data of the first model basis received from each service party by one of: averaging, weighted averaging, or processing the corresponding gradient data arranged in a chronological order by using a pre-trained long short-term memory model.

10. The non-transitory, computer-readable medium according to claim 7, wherein the respective local service model comprises a graph neural network, wherein each service party holds respective graph data constructed using local data, and wherein the respective graph data comprise heterogeneous graphs.

11. The non-transitory, computer-readable medium according to claim 7, wherein the respective gradient data corresponding to each model basis comprises gradients respectively corresponding to reference parameters in each model basis.

12. The non-transitory, computer-readable medium according to claim 7, wherein the respective combination of the plurality of model bases comprises at least one of:
   a linear combination of the plurality of model bases; or
   a network architecture search (NAS) based on the plurality of model bases.

13. A computer-implemented system, comprising:
   one or more computers; and
   one or more computer memory devices interoperably coupled with the one or more computers and having tangible, non-transitory, machine-readable media storing one or more instructions that, when executed by the one or more computers, perform one or more operations comprising:
   determining, by a plurality of service parties, a plurality of model bases, wherein each model basis of the plurality of model bases comprises a plurality of corresponding reference parameters;
   constructing, by each service party of the plurality of service parties, a respective local service model based on a respective combination of the plurality of model bases;
   determining, by each service party, respective gradient data corresponding to each model basis including processing respective local training samples using the respective local service model;
   sending, by each service party, the respective gradient data to a server;
   determining, by the server, that a first model basis of the plurality of model bases satisfies a gradient update condition pre-stored in the server;
   in response to determining that the first model basis satisfies the gradient update condition, combining, by the server, corresponding gradient data of the first model basis received from each service party to obtain global gradient data corresponding to the first model basis;
   sending, by the server, the global gradient data corresponding to the first model basis to each service party; and
   training, by each service party, the respective local service model including updating reference parameters in local model basis corresponding to the first model basis using the global gradient data.

14. The computer-implemented system according to claim 13, wherein the gradient update condition comprises at least one of:
   a quantity of gradient data of the first model basis received by the server from the plurality of service parties reaches a predetermined quantity; or
   an update period has arrived.

15. The computer-implemented system according to claim 13, wherein the server combines the corresponding gradient data of the first model basis received from each service party by one of: averaging, weighted averaging, or processing the corresponding gradient data arranged in a chronological order by using a pre-trained long short-term memory model.

16. The computer-implemented system according to claim 13, wherein the respective local service model comprises a graph neural network, wherein each service party holds respective graph data constructed using local data, and wherein the respective graph data comprise heterogeneous graphs.

17. The computer-implemented system according to claim 13, wherein the respective gradient data corresponding to each model basis comprises gradients respectively corresponding to reference parameters in each model basis.

18. The computer-implemented system according to claim 13, wherein the respective combination of the plurality of model bases comprises at least one of:
   a linear combination of the plurality of model bases; or
   a network architecture search (NAS) based on the plurality of model bases.

* * * * *